April 27, 1926.  E. ZOPF  1,582,499
APPARATUS FOR ELECTRICAL PRECIPITATION OF SUSPENDED MATERIAL FROM GASES
Filed Oct. 10, 1924
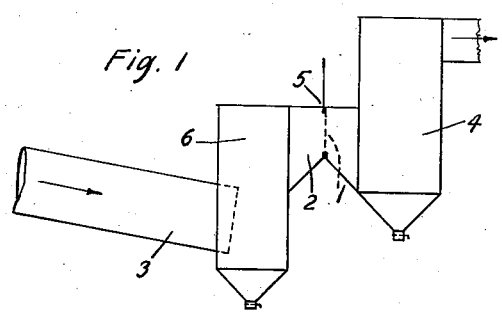
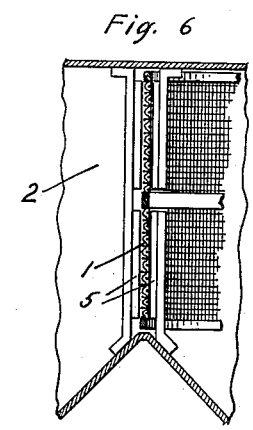
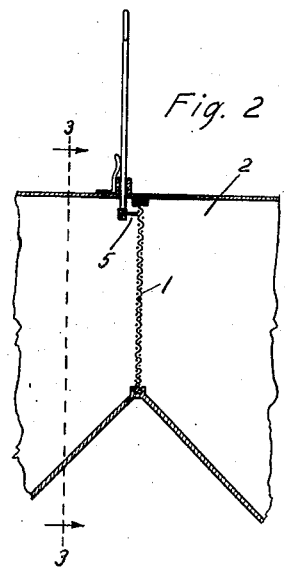
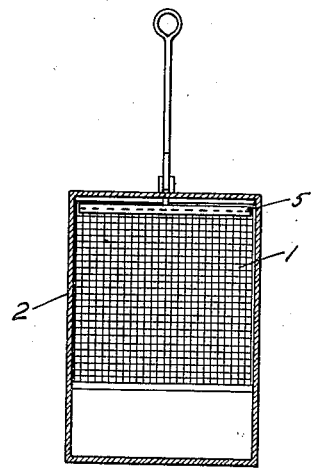
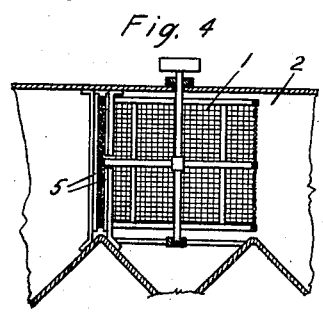
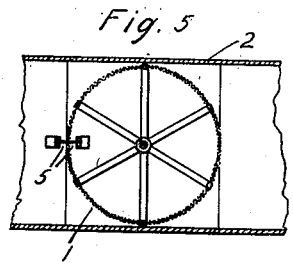
INVENTOR.
Emil Zopf
BY Arthur P. Knight
ATTORNEY.

Patented Apr. 27, 1926.

1,582,499

UNITED STATES PATENT OFFICE.

EMIL ZOPF, OF FRANKFORT-ON-THE-MAIN, GERMANY, ASSIGNOR TO INTERNATIONAL PRECIPITATION COMPANY, OF LOS ANGELES, CALIFORNIA, A CORPORATION OF CALIFORNIA.

APPARATUS FOR ELECTRICAL PRECIPITATION OF SUSPENDED MATERIAL FROM GASES.

Application filed October 10, 1924. Serial No. 742,948.

To all whom it may concern:

Be it known that I, EMIL ZOPF, a citizen of the Republic of Germany, residing at Frankfort-on-the-Main, Hesse-Nassau, Prussia, Germany, have invented a new and useful Improvement in Apparatus for Electrical Precipitation of Suspended Material from Gases, of which the following is a specification.

This invention relates to apparatus for electrical precipitation of suspended material from gases containing combustible material, either as a constituent of the gases or of the suspended material, and the main object of the invention is to provide means for safeguarding the apparatus from explosion or combustion by preventing propagation of flame from the electrical precipitator back through the flue or conduit through which the combustible gases are furnished to the electrical precipitator.

In many industrial processes gases containing combustible material in the form of gases, vapors, liquid or solid suspended matter (such gas being produced for example by the operation of dryers, retorts or other apparatus in which combustible material is subjected to the action of heat) are required to be cleaned or subjected to separating operation to separate suspended matter from the gases. When electrical precipitation is used for this purpose it has been found that in some cases there is a liability of combustion or explosion by ignition of combustible matter in the gases by electrical sparks produced within the electrical precipitator and it is desirable to prevent such explosion or combustion from passing back to the dryer, retort or other apparatus furnishing the combustible gases. This object I effect by interposing a screen of suitable mesh between the electrical precipitator and the said apparatus furnishing the combustible gases, said screen extending across the flue so as to intercept all of the gases and prevent passage of flame therethrough.

The accompanying drawings illustrate embodiments of my invention and referring thereto:

Fig. 1 is a diagrammatic side elevation of apparatus embodying my invention.

Fig. 2 is a section of a part of the flue including the screen.

Fig. 3 is a transverse section on line 3—3 in Fig. 2.

Fig. 4 is a vertical section and Fig. 5 is a horizontal section of a modification of the invention.

Fig. 6 is a more detailed section of the scrapers and adjacent portion of the screen shown in Figs. 4 and 5.

I will particularly describe my invention as applied in connection with a dryer for combustible material, especially lignite, which is provided with an electrical precipitator for removing small dust particles from the current of drying air. According to the invention, in order to prevent flashing back and ignition of the combustible material in the dryer due to electrical discharge in the precipitator, a screen 1 is placed in the gas passage indicated at 2 leading for example from the discharge hopper 6 of a dryer indicated at 3 to an electrical precipitator 4, such screen completely filling the section of the passage and cooperating continually or intermittently with a scraper or cleaning means 5. This screen, whole operation is based on the principle of the miner's safety lamp, constitutes an effective fire screen for the dryer. By cooperation with the scraper or other cleaning means the meshes of the screen are kept always free from particles of combustible material, so that the flow of gas is not hindered, and the particles cannot become caked upon it.

The screen can be of any desired form. It is particularly advantageous to construct the screen as a rotating drum as shown at 1 in Figs. 4 to 6, said drum being provided with any suitable means for continual or intermittent rotation of the same and cooperating with one or more scrapers 5, for in this way the protective effect of the screen is doubled.

While I have described my invention as applied in connection with gases from a lignite dryer it will be understood that it is applicable generally in connection with any apparatus producing a combustible or explosive mixture of gases and suspended matter, whether the combustibility arises from a constituent of the gases or a constituent of the suspended matter, or both. For example the invention may be applied in connection with the gases from an apparatus for heat treatment of petroleum residues or sludge where the electrical precipitator is used to separate acid fumes from the gases resulting from treatment of such sludge with a current of heated air, and where hydrocarbons carried over with such acid fumes are liable to be ignited by sparks in the electrical precipitator.

What I claim is:

1. In combination with an apparatus adapted to produce a combustible or explosive mixture of gas and material suspended therein, an electrical precipitator, a flue connecting the aforesaid apparatus to the electrical precipitator to conduct said gases from said apparatus to said precipitator, and a screen interposed in said flue and adapted to prevent propagation of flame from said electrical precipitator to said apparatus.

2. The invention as claimed in claim 1, in combination with cleaning means adjacent said screen, and means for continuously effecting relative movement of said screen and cleaning means during the passage of gas through said flue.

3. The invention as claimed in claim 1 wherein said screen comprises a cylindrical screen rotatably mounted on an axis extending transversely of said flue, the peripheral wall of said screen being substantially tangent to opposite walls of said flue, whereby the gas must pass through the screen twice in traversing said flue.

In testimony whereof I have hereunto subscribed my name this 17th day of September, 1924.

EMIL ZOPF.